Aug. 19, 1969  J. E. HUFFAKER  3,462,226
PREREGISTRATION AND LAYOUT OF THREE-DIMENSIONAL PRINTS
Filed Oct. 6, 1966  4 Sheets-Sheet 1

JAMES E. HUFFAKER
INVENTOR.

BY

*Leigh B Taylor*
ATTORNEY & AGENT

JAMES E. HUFFAKER
INVENTOR.

BY

*Leigh B. Taylor*
ATTORNEY & AGENT

Aug. 19, 1969      J. E. HUFFAKER      3,462,226
PREREGISTRATION AND LAYOUT OF THREE-DIMENSIONAL PRINTS
Filed Oct. 6, 1966      4 Sheets-Sheet 4

JAMES E. HUFFAKER
INVENTOR.

BY

*Leigh B Taylor*

ATTORNEY & AGENT

United States Patent Office 3,462,226
Patented Aug. 19, 1969

3,462,226
PREREGISTRATION AND LAYOUT OF
THREE-DIMENSIONAL PRINTS
James E. Huffaker, Kingsport, Tenn., assignor to Eastman Kodak Company, Rochester, N.Y., a corporation of New Jersey
Filed Oct. 6, 1966, Ser. No. 584,918
Int. Cl. G01n 21/00, 21/04; B41c 3/00
U.S. Cl. 356—72                         7 Claims

ABSTRACT OF THE DISCLOSURE

A method of assuring resistry of uniform images with the embossed lenticular screen utilizing moire fringes generated by the line grating and said embossed lenticular screen.

---

This invention relates to the form of stereo prints in which a lineiform image is printed on paper and then coated with a plastic material, the surface of which is embossed to form the azimuth defining means through which the lineiform image is viewed.

The embossed lenticules must be registered with the elements of the lineiform image and the object of the present invention is to assure strict parallelism between the lenticules and the printed image.

By way of background, a parallax panoramagram (sometimes called an autostereo print) is a type of stereographic reproduction constituted by a phonograph or printed image viewed through a line screen (picket fence) or through a lenticular screen, so that one sees a true stereo picture and (as the head is moved or as the picture is rotated) one sees the subject from different angles (in stereo) at each angle. The reproduction is obtained through the following series of steps: First, an object is photographed with a special camera from a plurality of angular positions onto a film having a taking screen (line or lenticular) disposed in front of the film. As the camera is moved, the screen is shifted slightly with respect to the film to provide, at each screen position, a series of vertical line images corresponding to the angular position of the camera. The resultant picture is called a lineiform image. When developed, printed, and viewed through an equivalent screen, a stereoscopic effect is obtained, the eyes of the observer corresponding to two of the angular positions of the camera. A slight turn of the picture presents a slightly different pair of views and hence the observer seems not only to see depth, but also seems to move around the object.

The taking and viewing screens are respectively referred to as the taking and viewing azimuth defining means. The picket fence form of line grating (that is, the line screen) may have, for example, one hundred lines per inch, the light transmitting area constituting approximately ten percent of the area of the screen. Alternatively, the line grating may be a lenticular screen, that is, a transparent sheet having a surface embossed with contiguous ribs, each presenting a cylindrical surface and forming a lenticule or lenticular lens.

To make a large number of such prints as, for example, for use in a periodical or a large number of advertising displays, the process employed includes the steps of printing several identical pictures, that is, the lineiform images, on paper, coating the paper wih a plastic, and finally embossing the plastic to mold it in the form of a lenticular screen. The number per inch in the printed lineiform images must exactly correspond to the number of lines per inch in the embossed lenticular screen and the lenticules of the embossed screen must be precisely parallel to the lines of the images for otherwise distracting areas of moire pattern would occur. The stereo effect would be different in different areas of the picture and hence most annoying.

The method of sizing the lineiform image to the number of lines in the lenticular screen is described, for example, in copending application Ser. No. 465,491, filed June 18, 1965. The present invention is directed to the method of maintaining the parallel relationship of the screen lenicules to the lines of the lineiform image.

The usual practice to assure precise parallelism has been to print the lineiform image with its lines as precisely parallel as possible to the sides of the sheet of paper on which it is printed. Then some sample sheets are run through the coating and embossing machine. Any lack of parallelism between the embossed lenticules and the image shows up as moire fringes. The direction or lay of the embossing plate is then changed and more sample sheets are run through it and further adjustments made until the sample runs display no moire fringes.

There are some problems, discussed below, whenever the "lay" of the embossing plate is changed. These particular problems do not come up when the direction or "lay" or the printing plate is changed. However, it is impractical to repeat the whole cycle of printing, coating and embossing many times while adjusting the lay of the printing plate.

The primary object of the present invention is to provide a method of registering the printing plate very precisely with the lay of the embossing plate which has, of course, not been used at the time the printing plate operation is performed.

The "lay" of the embossing plate is the term applied to, the orientation of the plate. The embossing roller is formed by wrapping a thin embossing plate about a drum or roller, the leading edge of the plate being clamped in a gripper fixed on the drum. Incidentally since the number of lines per inch of any metallic embossing plate depends on the temperature of the plate, the drum is carefully chilled or heated to the proper temperature. So-called "hot melt" coatings are embossed during the cooling step and this also requires the drum to be continuously chilled. Whether "hot melt" is used or not, the embossing operation is most efficient when the temperature is within some given range, depending on the particular plastic being embossed. Nevertheless variations within this range can be used to change the number of lines per inch. The gripper which clamps the leading edge of the embossing plate is adjustable as it is in any duplicating machine. That is, the plate can be moved sideways or can be rotated slightly by adjusting suitable screws or the equivalent which engage the gripper.

For the first run, the grooves on the embossing plate are positioned, as close as possible, perpendicular to the gripper edge. When samples of the printed sheets are coated and embossed, improper alignment shows up as moire, since the lines of the viewing screen are not parallel to the lines of the printed lineiform image. As mentioned above, the customary and direct way of correcting this has been to adjust the angle of the embossing plate on the drum until the moire patterns disappear. Parallel relationship of the lenticular screen to the lineiform image is thus obtained.

However, with such a procedure many problems arise. The shifting of the embossing plate on the chilled drum to change the alignment resulted in an imperfect fit of the embossing plate to its cylinder. An imperfect fit is not too serious in ordinary printing operations, but in the case of the embossing plate, it resulted in air pockets between the chilled cylinder or drum and the embossing roller. These air pockets prevented the coating plastic from being uniformly chilled and hence properly embossed by the embossing plate. Further, many plastics have a tendency to stick to the embossing plate areas which are not properly chilled, i.e., in areas overlying the air pockets. Thus adjusted embossing plates often fail to give uniformly high quality results.

According to three embodiments of the present invention there are respectively three procedures having "feed back" of the latent orientation of the embossing plate into the system at the time the lineiform prints are made so that the lay of printing plate can be adjusted in advance of any embossing.

PROCEDURE 1

With this particular procedure the coating and embossing machine is set up and a print of the exact pattern of the embossing plate is made from the embossing plate. One simple method of doing this is to run a piece of carbon paper in contact with a sheet of paper through the embossing rollers. This provides a print of the exact pattern of the embossing plate on paper whose direction of travel (controlled by the edges of the paper) is exactly the same as that which will be travelled by the final lineiform prints when they are being coated and embossed. A large number of these carbon prints are made up and a number of them are used every time a printing plate has to be adjusted. It should be realized that the same embossing roller will be used for many different lineiform pictures.

Using the sheets carrying the embossing plate pattern as supply sheets, a number of lineiform pictures are printed. In general, in spite of care in attaching the printing plate to the printing drum, for example on an offset printer, the printed image will not be in strict parallelism with the already-printed pattern. The moire pattern which is thus displayed indicates the amount of adjustment that is required regarding the alignment the printing plate. This adjustment is made using the adjusting screws provided on all precision printing equipment. The adjustment is a little difficult to make by hand as would be required with inexpensive offset presses but even this is not impossible. Parallax panoramagram printing is pretty well confined to high quality press work and hence the adjusting screws are usually present on the press.

When the printing plate is in proper adjustment, the prints to be coated and embossed are found to be in precise parallelism with the embossers.

PROCEDURE 2

A slightly more sophisticated procedure does not make the control sheet directly from the embossing plate. As a first step, a printing plate is made up with a plurality of elongated line grating patterns set at very slight angles to each other. For example there may be 7 patterns each about ½ inch wide and 2 feet long and each having about 50 lines therein. That is, the patterns are 100 lines per inch. The angles between adjacent patterns are represented by one additional moire fringe as seen against a control line grating. That is, the strips are tilted about 1 line width, i.e., about $\frac{1}{100}$ of an inch at one end of the two-foot strip. The angle is only a few seconds of arc. A large number of sheets are printed from this printing plate and for convenient reference, they are herein referred to as "A sheets." Several "A sheets" are coated and embossed with the embossing plate locked in position it is to be used. In general it will be found that all of the line grating patterns, except one, will produce moire patterns when seen through the embossings. The correct (non-moire) line grating is noted. This corresponds to a particular direction. In this simple Procedure 2, the "A sheets" are then used for printing lineiform pictures as in Procedure 1. The printing plate is adjusted until parallelism is assured with respect to the "correct line grating" of the "A sheets." Now when lineiform pictures are printed from this printing plate and coated and embossed with this embossing plate, precise parallelism is assured.

PROCEDURE 3

This is similar to Procedure 2 but is slightly more sophisticated and permits an additional control to be introduced. Not only must parallelism be precisely established, but the overall process requires that the number of lines per inch in the embossing roller exactly match the number of lines per inch in the lineiform image. It is easier to recognize slightly improper sizing giving one moire band every inch than it is to recognize a perfect matching in sizing in which there is no moire pattern. This is similar to the tuning of an instrument such as a piano; beat frequencies can be easily detected whereas perfect match in tune is not so easily recognized. The added feature introduced in this Procedure 3 is that the control sheets, herein called "B sheets," have one more or one less line per inch than the lineiform image and the embossing plate.

According to this Procedure 3, a printing plate is made of a line grating and purposely has the one extra or one less line per inch. This printing plate is mounted on a printing drum and in order to align it properly a large number of prints are made directly onto some "A sheets," which are made by the first steps of Procedure 2 above.

When the alignment of the new printing plate is established, with reference to the "correct line grating" of the "A sheets," plain paper is fed through the printer and a large number of sheets are printed. These are called "B sheets." They contain, properly aligned, a very large line grating pattern having one extra or one less line per inch. Usually a few hundred B sheets are made up since they can be used for many different lineiform pictures, as long as the embossing plate adjustment is not changed.

As in Procedures 1 and 2, each lineiform printing plate is aligned by making prints on the B sheets and adjusting the printing plate until the moire patterns are removed. That is, the oblique fringes are removed. The parallel or beat frequency fringes are still present.

The "B sheets" now show not only proper alignment but also the sizing of the lineiform printing plate. For example, its size may be slightly different from that anticipated so that instead of one moire fringe per inch, one gets only one moire fringe every two inches. The embossing plate is then adjusted by controlling the temperature so that it is the proper size, i.e., so that the embossings also give one moire fringe every two inches over the B sheets or no moire fringes over the lineiform image.

The printing plate for printing the lineiform images is lined up by printing onto several B sheets and noting any lack of alignment. The printing plate is adjusted as in Procedure 1 until the images appear in perfect parallelism on the B sheets. A commercial run is then made printing the lineiform pictures onto plain paper followed by coating and embossing, with parallelism and sizing being fully assured. This is the preferred embodiment of the present invention.

In all three procedures, one insures parallelism of the lenticular embossing means to the printed lineiform image. In both the embossing means and the lineiform image, the direction of the lines is relative to the edge of the sheet (or roll). That is, the embossing means includes means for guiding the edge of the sheet being embossed. Similarly the printing press on which the lineiform images are printed onto paper includes means for guiding the edge of the sheet being printed. This is all understood when one discusses the parallelism of the embossing means to the printed lineiform image.

Procedure 1 simply prints the control line gratings (a plurality of sheets with line gratings in parallel register to the embossing means) directly from the embossing means, e.g. by carbon paper or by inking the embossing surfaces.

Procedure 2 prints a fan of line gratings (one of which is in parallel register to the embossing means) and then identifies which one is to be used as the control line grating.

Procedure 3 starts with the identified control line grating of Procedure 2 and, with sizing added, again prints a plurality of sheets with gratings in parallel register to the embossing means.

In Procedure 2, the fan of line gratings consists of at at least five line gratings at slight angles to each other. The exact tilt of adjacent line gratings is not critical but over a length of say 10 or 20 inches, the lines should tilt about 1 or 2 or a few lines (at the top relative to the bottom of the line grating). That is the relative tilt should be on the order of the width of one line of the line grating. If one is aiming for parallelism within one line (150 to the inch) in 24 inches, the preferable relative tilt is about 1:3600 since moire disappear from the control system at the same setting as it does in the final picture.

The moire pattern due to lack of parallelism, i.e. tilt, appears as broad bands more or less horizontal, i.e. at right angles to the lines of the line gratings or lenticules. After strict parallelism is achieved, any difference in the number of lines per inch between the line gratings or images, appears as a parallel or vertical type moire, a sort of beat frequency. It is this latter pattern which is used for sizing as one of the extra features in Procedure 3. For many "runs" of many different pictures with the same embossing means, Procedure 3 turns out to be the most useful.

COLLAGE

A layout of two or more pictures to be printed simultaneously is sometimes called a collage. Special arrangements include photomontage effects. However the most common multiple layout or collage includes a large number, say sixteen, identical pictures to be printed simultaneously to provide efficient use of the printing presses. A collage of autostero prints each according to the present invention involves the principle of the present invention at three different steps. In the first place, a preferred layout procedure employs "B sheets" as produced in Procedure 3 above. Secondly the principle of the invention is used for insuring that all sixteen of the lineiform pictures are in absolute parallelism with each other. Finally the invention is used to orient the printing plate with the sixteen identical areas, properly so as to be parallel with the eventual embossing.

The first step of this layout or collage procedure is to coat and emboss a "B sheet" to use as a reference standard in one of the later steps.

Secondly, the required number (sixteen in the example being discussed) of positive transparencies of line gratings are made up with matched size or pitch. These can have exactly the same size as the B sheets or the same size as the ultimate lineiform image or may differ therefrom by not more than one or two lines per inch. Since they are to be used only for parallelism control, they are usually of the same pitch or size of the lineiform images. Any method of making such transparent line gratings may be used. A large drawing can be photographed on a lith type film, for example. The transparencies are made on stripping film.

The third step again starts with a B sheet and a positive transparency thereof is made photographically by projecting an image of the B sheet onto a large sensitive film. This positive of the B sheet is covered with Mylar or other thin transparent sheeting, preferably a material of high size stability. The sixteen line grating transparencies, having been made on stripping film are then transferred (stripped) onto the Mylar sheet while viewing through the line gratings to be sure that each is in perfect parallelism with the positive of the B sheet lying below the Mylar. Registering images by stripping procedures is very common practice in the graphic arts of all types. It is at this point that the embossed B sheet of step one is used as a standard of comparison. The moire pattern of the line gratings being stripped onto the Mylar (as compared to the positive of the B sheet below the Mylar) should look identical to the reference standard. At completion of this third step one has a Mylar sheet with sixteen perfectly aligned line gratings forming a square layout with four line gratings along each side of the square.

This sheet with the perfectly aligned line gratings is now used as a reference standard while making a layout of the sixteen identical lineiform images. For example, the lineiform images of one color separation of a color print are stripped onto a glass sheet placed over the Mylar sheet with its line gratings. Looking through the lineiform image during this stripping operation, one sees moire patterns with the grating underneath and parallelism of the lineiform images is assured. Looking at the other side, i.e., looking at the lineiform image through the line grating, produces the stereo effect similar to that of the ultimate picture. When this step is complete one has sixteen identical lineiform images mounted on a glass sheet all in perfect parallelism.

In the next step a single printing plate is made by projection printing from the collage of lineiform images.

The invention now comes into use once more. The printing plate is mounted on a printing press and several "B sheets" are run through the press. In general there will be moire patterns. The alignment of the printing plate on the press is then adjusted until the moire patterns, when printed on B sheets, are eliminated. Prints run on plain paper are then coated and embossed, sixteen at one time, with parallelism and size of embossing assured.

One common stripping procedure involves laying a transparent sheet on the support which is to receive stripped image. The image to be stripped is then laid face down on this auxiliary transparent sheet with one edge extending over the edge of the transparent sheet and onto the eventual support. Adjustment of the strippable image is then made until the desired registration is obtained. The edge touching the ultimate support is then clamped usually by pressing with the thumb and forefinger. The auxiliary transparent sheet is removed and the strippable image is squeegeed onto the ultimate support. The temporary support for the strippable image is then stripped away leaving the image "stripped" onto the ultimate support.

Figure 1:
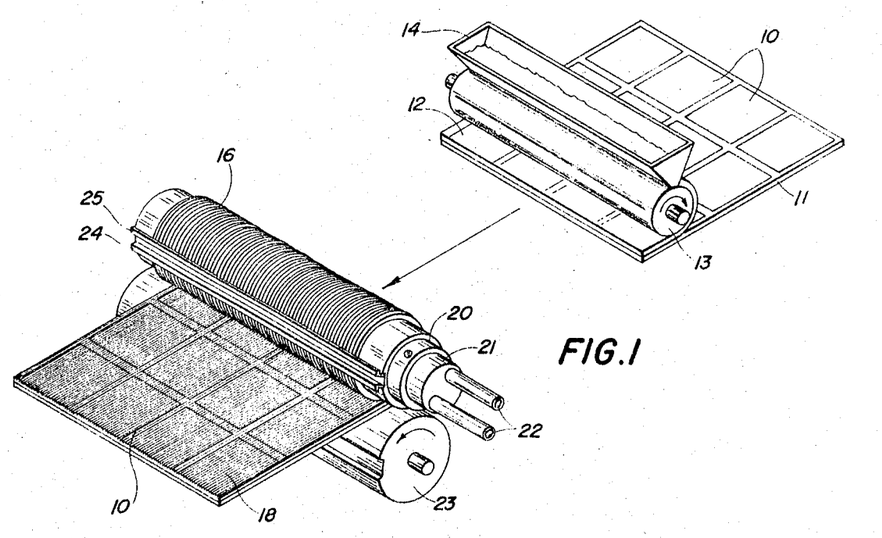
FIG. 1 is a diagrammatic perspective of a machine for coating and embossing lineiform images.
Figure 2:
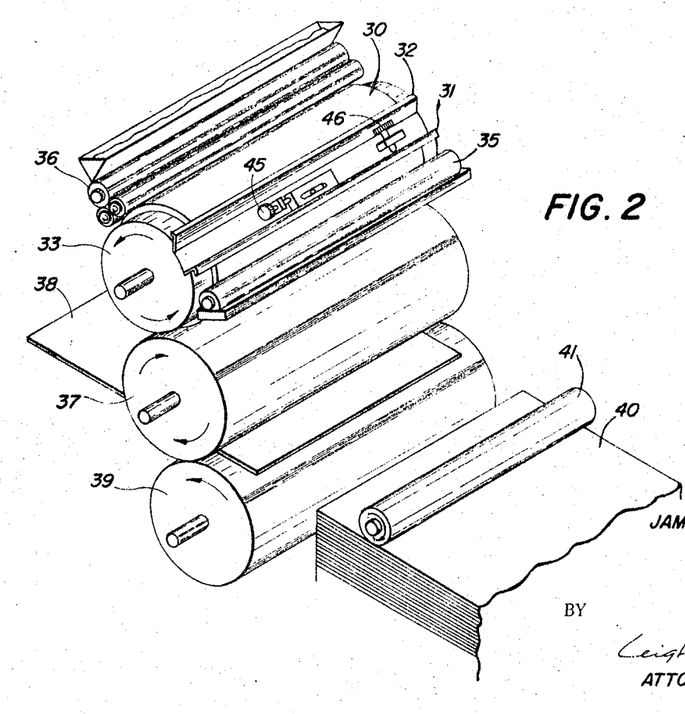
FIG. 2 similarly illustrates an offset litho press for printing images such as lineiform images.

The objects of the invention and the operation of the various embodiments thereof will be more fully understood when read in connection with the accompanying drawings, in which:

FIGS. 1 and 2 are intended merely to illustrate prior art equipment which can be used in the present invention.

In FIG. 1, a lineiform print made up of a plurality of lineiform images 10 in perfect alignment on a sheet of paper 11, is provided with a resin coating 12 by passing under a coating roller 13 to which the resin or plastic is supplied from a hopper 14. Any standard coating procedure may be used. Various preferred resins or plastics are known, depending on the size of the eventual lenticules desired. The coated sheet is then passed under an embossing plate 16 which provides embossings 18 in register with the lineiform printed images 10. The plate 16 is mounted on a metal drum 20 which turns on a core 21 whose temperature is carefully controlled by water supplied and removed through pipes 22. In general cold water is used to chill the drum 20 to the temperature at which the embossings "set" uniformly. The leading and trailing edges of the embossing plate 16 are clamped to the drum 20 by clamps illustrated schematically at 24 and 25. When the embossings do not line up perfectly with the images 10, the prior practice was to adjust the clamp 24 by screws not shown in FIG. 1 but similar to those shown in FIG. 2, and finally tightening clamp 25. This procedure, however, introduced the problems mentioned above. The backing roller for the embossing system is shown at 23.

In FIG. 2 a printing plate 30 is clamped by leading edge clamp 31 and trailing edge clamp 32 to a cylinder of a rotary offset press. The plate 30 is a lithographic plate. During the printing operation it is first moistened with water by moistener 35 and then passes under inking rollers 36 and the image is offset to a blanket or offset roller 37 and eventually transferred to a sheet of paper 38 as it is moved between rollers 37 and 39. Paper from a stack 40 is fed in the usual way to the press by a drive roller 41. This is all shown very schematically and is intended to represent a standard offset press. The important features are also illustrated schematically since they are well known and appear on all but the most inexpensive rotary offset presses. These features consist of an adjusting screw 45 for moving the clamp 31 laterally to provide adjustment of the printing plate 30 and an adjusting screw 46 which turns the clamp 31 about a pivot (the pivot being the center connection upon which the screw 45 operates). Turning the screw 46 moves the clamp 31 through a very slight angle thus changing the alignment of the printing plate 30. Whereas the prior systems printed the lineiform images first and then aligned the embossing plate 16 of FIG. 1 to match the printing plate, the present invention always adjusts the printing plate such as 30 so that its alignment automatically is perfectly parallel with the ultimate embossing plate 16 of FIG. 1. Essentially the present invention provides a means for knowing exactly how much to adjust the screw 46 so that no further parallelism adjustments are needed in the complete printing, coating and embossing operation.

Figures 3, 5:
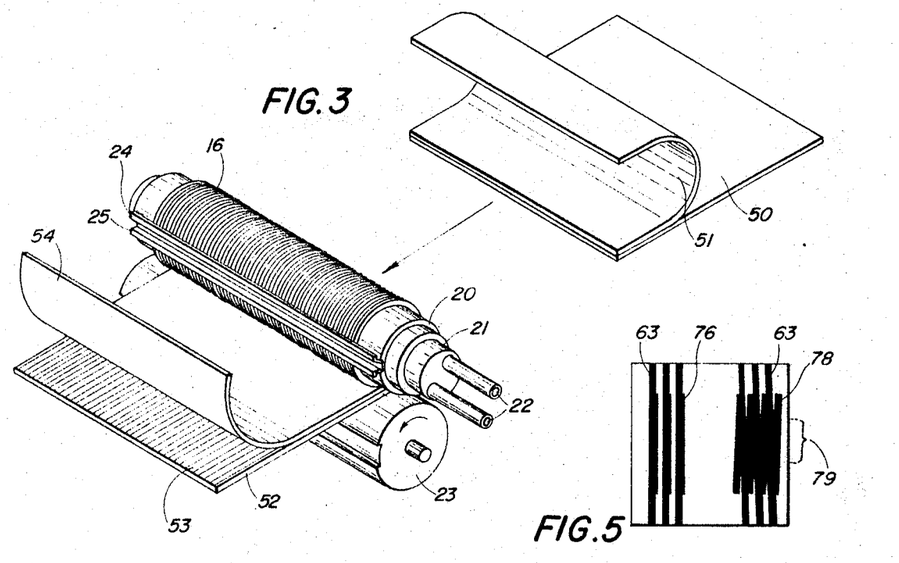
FIG. 3 similarly illustrates the making of pattern sheets for use in Procedure 1.
FIGS. 4, 5 and 6 similarly illustrate the making of pattern sheets for use in Procedure 2 discussed above.

According to the embodiment of the invention herein referred to as Procedure 1, sheets of paper are printed with the pattern of the embossing plate 16. This can be done in any number of ways, the simplest being those which employ pressure sensitive sheets. One of the simplest types of pressure sensitive sheet is the ordinary carbon paper used in typewriters. This material works quite well, and for this reason more elaborate pressure sensitive materials are not needed. In FIG. 3 a sheet of paper 50 on which a sheet of carbon paper 51 is placed is passed through the embossing machine and under the embossing roller 16 (mounted permanently in place). This produces a printed sheet 52 with the pattern 53 corresponding exactly to the pattern of the embossing plate 16. The carbon paper 54 which was laminated to the sheet 52 is then discarded. FIG. 3 is only schematic and it should be realized that the sheet feeding mechanism includes guides for the edges of the paper sheets and these guides are the same ones which will be guiding the ultimate coated lineiform images through the embossing roller. Thus the carbon pattern 53 printed on the sheet 52 represents both the pattern and the alignment of the embossing roller 16, the alignment being in reference to the sides of the sheet 52.

According to the invention, a stack of these sheets 52 with the pattern 53 are fed through the printing press illustrated in FIG. 2 with the desired lineiform printing plate mounted at 30. In general the first sheets run through with both the pattern 53 and the lineiform picture from the plate 30 printed thereon will exhibit moire pattern due to lack of parallelism. A skilled eye can see how much adjustment is needed, but it is simpler to turn the screw 46 slightly and run another pattern sheet through the press. This adjustment of screw 46 is repeated until the pattern sheets are running through with no moire pattern. Plain sheets of paper are then printed with the printing plate and coated and embossed as shown in FIG. 1 with parallelism of the lineiform image and the lenticules being assured.

In actual practice, lineiform images and embossing plates of at least 120 lines per inch are used. This requires high resolution in the pattern 53 to give clear moire images with the lineiform pictures. Higher resolution can be obtained by Procedures 2 and 3 described below and hence they are preferable.

Figure 4:
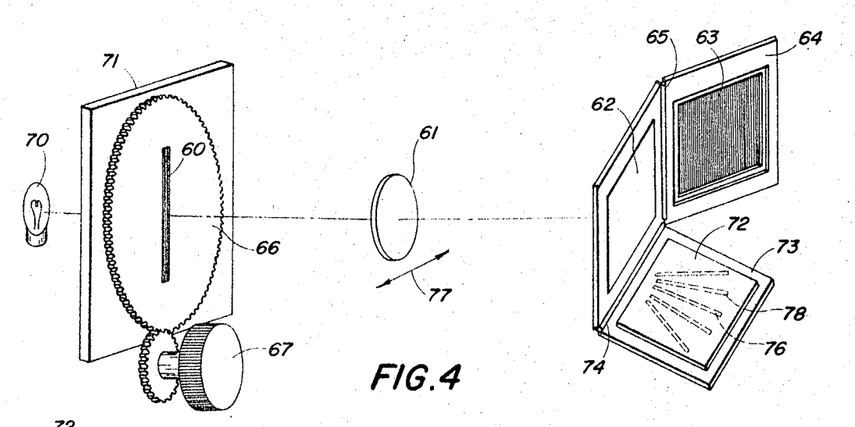

Procedure 2 incolves the production of pattern sheets herein referred to as "A sheets." The manufacture of "A sheets" is illustrated in FIGS. 4–7. In FIG. 4 a line grating transparency 60 consists of a carefully made trasparency ½ inch wide and 2 feet long having alternate clear and opaque areas of equal width and having 75 lines across the ½ inch width. This system is illustrated with respect to a 150 line stereo system. An image of the object line grating 60 is projected at 1:1 magnification on an image plate 62. A viewing screen 63 which is also a line grating replaces the ground glass in a process camera and it mounted in the frame 64 hinging as indicated at 65. The image of the object 60 as seen through the grating 63 when the latter is brought into the image plane 62, will exhibit a moire pattern except when the image is precisely parallel to the line grating 63. Parallelism can be assured by rotating the object line grating 60 which is mounted in a gear 66 which can be turned by knob 67. The object line grating 60 is trans-illuminated by a lamp 70 through a ground glass 71.

A plurality of exposures are made onto a sensitive film 72 which is mounted in a frame (the usual vacuum frame 73 of a process camera hinged along the line 74). For example with the object line grating 60 in perfect alignment with grating 63 a latent image 76 is printed. The frame 73 is then moved out of position and the line grating 63 brought again into the image plane 62. The camera is adjusted sideways for example by moving the lens 61 sideways slightly as indicated by the double-headed arrow 77. Various precise arrangements are available on standard process cameras for sideways adjustment. The gear 66 is then rotated very slightly by turning the knob 67 while watching the moire pattern between the image and the line grating 63. When a single transverse moire fringe appears along the image, one end of the object line grating 60 has been moved one line relative to the other end. In the example given, the line grating 60 has been rotated through an angle whose tangent is .0066/24. The film is then brought back into the image plane and another latent image 78 printed at a very slight angle to the image 76.

In all of the drawings, five such images are shown. In actual practice seven appears to be a staisfactory number of such images but more may be used if desired. FIG. 5 illustrates the formation of the moire pattern. When the images 76 of the object pattern 60 are strictly parallel to the lines of the line grating 63, there is no moire pattern, but the image might be laterally offset slightly as shown. However when the image 78 of the object line grating 60 is at a slight angle, i.e., at a slight angle to the grating 63, the dark area or fringe 79 appears part way along the overlapped patterns. This is very easily detectable and hence the adjusting of the object line grating 60 to expose the various images 76 and 78 is quite precise.

Figure 6:
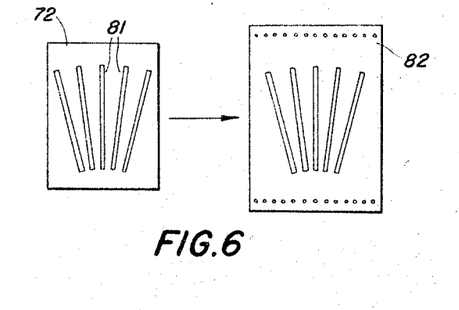

The film 72 is then processed to a negative having images 81 at a slight angle to each other as shown in FIG. 6. In the drawings the angles are greatly exaggerated and to the unaided eye, the images in actual practice appear to be exactly parallel to each other. A litho printing plate 82 is made by any standard procedure from the negative 72 with the images 81 thereon.

Figure 7:
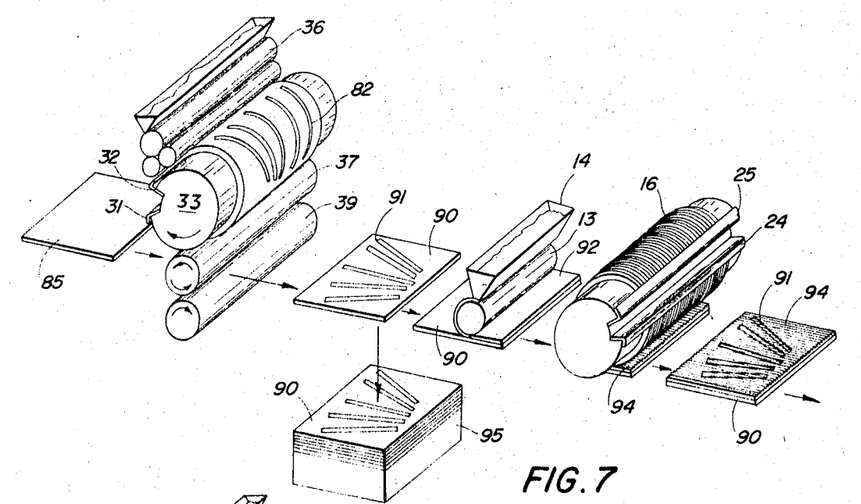
FIG. 7 similarly illustrates the embodiment of the invention referred to herein as Procedure 2.

In FIG. 7 the printing plate 82 is mounted in an offset press similar to that shown in FIG. 2. Sheets 85 of plain paper are run through the press making a large number of what are herein termed "A sheets" consisting of paper 90 with line grating images 91 printed thereon. A large stack of such "A sheets" are made for further use both in Procedure 2 and in lesser quantities in Procedure 3 discussed below.

According to Procedure 2 some of these "A sheets" 90 are run through the coating and embossing machine illustrated in FIG. 1 and again in this FIG. 7. The coating 92 is applied to the "A sheets" 90 and lenticules 94 are embossed thereon by embossing plate 16. In general some of the lenticules 94 will produce moire patterns with all of the images 91, except one. This one is herein referred to as the "correct line grating." The correct line grating is the one which is in perfect parallelism with the plate 16. Now that this "correct line grating" is recognized, it can be easily identified on the "A sheets" 90 in stack 95. In fact it can be marked on each of these sheets with a simple identification mark or it may be merely remembered.

According to Procedure 2 these "A sheets" are then used as the control sheets in FIG. 2 while the lineiform images of printing plate 30 are printed thereon. A number of sheets are run through the machine and the adjusting screw 46 is adjusted until there is no moire pattern between the lineiform images and the "correct line grating" identified on the "A sheets." The printing plate 30 is now in correct parallelism with respect to the ultimate embossing plate. Plain sheets of paper run through the printing press and then coated and embossed as in FIG. 1 are in perfect parallelism.

A more sophisticated embodiment of the invention herein referred to as Procedure 3 does two things. It eliminates the need for remembering which of the images on the "A sheet" is the "correct line grating" and also allows the introduction of the sizing control at this stage of the printing process. The sizing control is similar to that described in copending application 465,491, filed June 18, 1965, in which I am joint inventor with Bramlet L. Beard.

Figure 8:
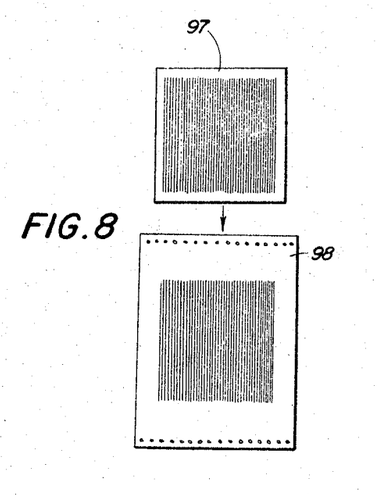
FIGS. 8, 9 and 10 similarly illustrate the method of making pattern sheets for use in the embodiment of the invention herein referred to as Procedure 3.

The first step of this Procedure 3 consists of preparing a standard line grating 97 (see FIG. 8) similar to line grating 63 used for reference in FIG. 4. A printing plate 98 is made by conventional procedures, all as schematically shown in FIG. 8. It is convenient for purposes of this description to show a printing plate as having perforated ends but any form of litho printing plate may be used.

Figure 9:
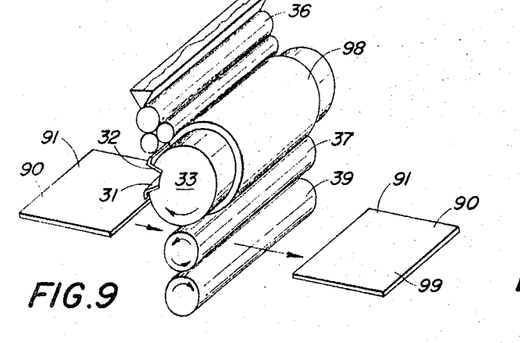
Figure 10:
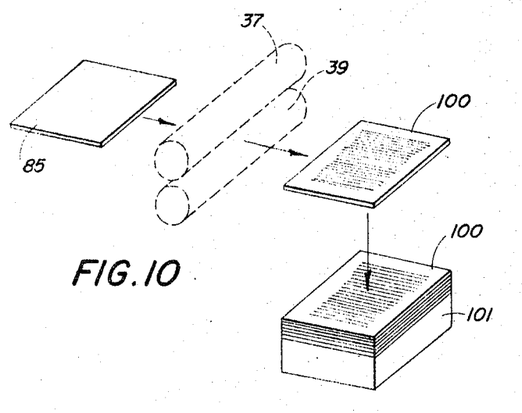

As shown in FIG. 9 the litho printing plate 98 is mounted in a printing press similar to that shown in FIG. 2 and a number of "A sheets" are passed through the press to print a pattern 99 superimposed on the line grating patterns 91. These patterns are not shown in FIG. 9 for the sake of clarity. Again it is a simple matter to recognize a moire pattern in all of the images 91 except one. The adjusting screw on the printing press is then turned, to adjust the alignment of the printing plate 98 until the moire pattern is eliminated on that one of the "A sheet" images which was identified in Procedure 2 as the "correct line grating." At this point the line grating of the printing plate 98 is aligned on the printing press to correspond to the alignment of the embossing plate 16 on the ultimate coating and embossing machine. Once this alignment has been accomplished, a very large number of plain sheets 85 are run through the press to print what are herin termed "B sheets" 100. A stack 101 containing a large number of "B sheets" is then made up. It will be noted that the "A sheets" of Procedure 2 are utilized in providing proper alignment of the line gratings appearing on the "B sheets."

According to Procedure 3 these "B sheets" 100 are then used in FIG. 2 and a number of prints are made from the printing plate 30 carrying the lineiform image. The screw 46 in FIG. 2 is adjusted until such prints on the "B sheets" show no moire pattern.

In all three procedures a line grating pattern is printed on a plurality of sheets, the orientation of the pattern to the sides of the sheets being precisely parallel to the orientation of the embossing plate relative to the sides of sheets passing through the embossing machine. A lineiform image is then printed onto at least one of the pattern sheets and the lay or orientation of the printing plate on the printing machine is adjusted in accordance with the moire pattern on the doubly printed sheet, specifically so that no moire pattern appears. Prints made from the printing plate thus adjusted are then coated and embossed in the usual way and parallelism between the lenticules and the lineiform image is assured.

COLLAGE PRINTING

Figures 11, 12:
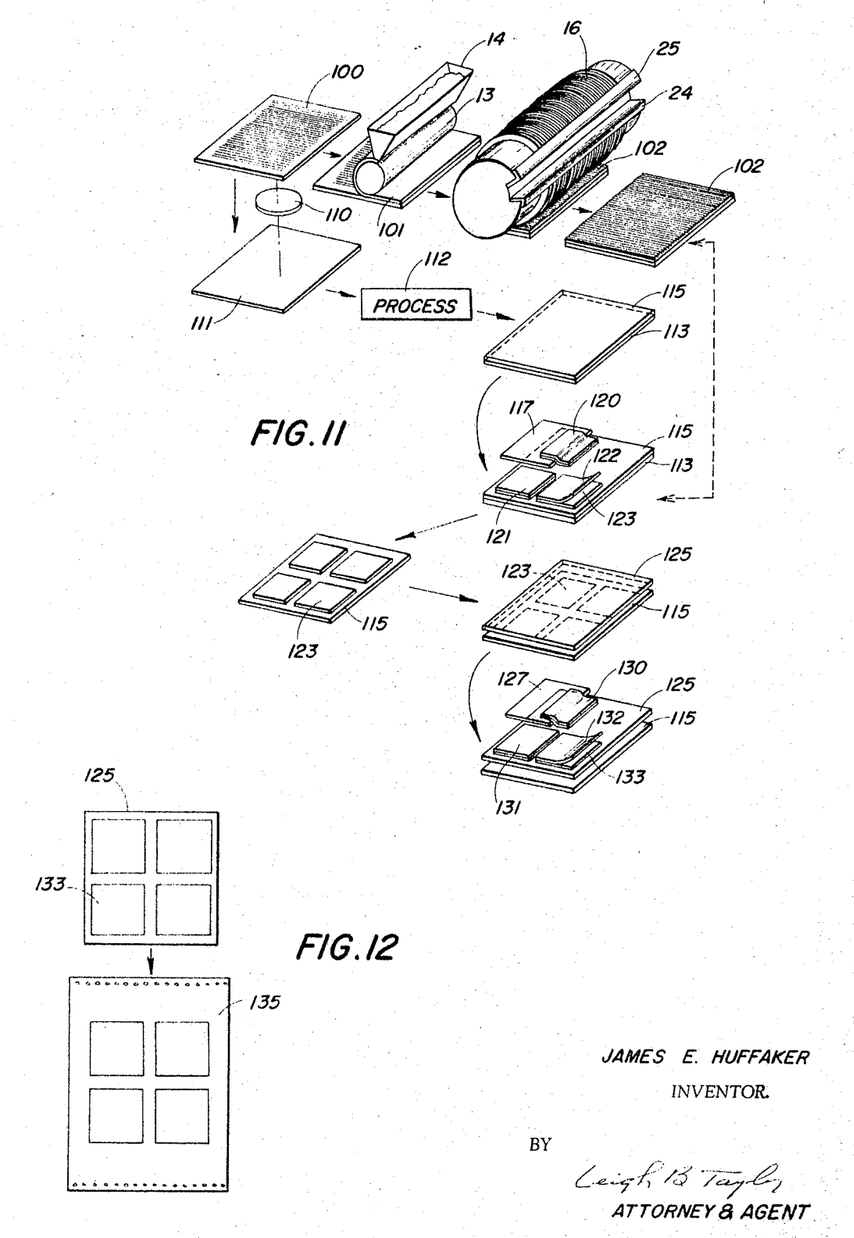
FIGS. 11 and 12 constitute flow charts illustrating in diagrammatic perspective the application of the principle of the invention to layout procedures.

The invention is used twice in multiple layout printing and the principle of the invention is also used a third time in such procedures. One such system is illustrated in FIGS. 11 and 12 in which four identical lineiform images are juxtaposed and printed simultaneously. In practice 16 such images are juxtaposed on a single printing plate, but only four are illustrated here for simplicity.

The procedure illustrated in FIG. 11 starts with "B sheet" 100. One such B shee is coated with a plastic coating 101 and then pressed under the embossing plate 16 to receive a lenticular surface 102. The "B sheet," as explained above, has a slightly different number of lines per inch than the embossing roller with the latter being properly sized as it is during the illustrated step. Thus there is a moire pattern between the embossings 102 and the printed pattern 100. However, this is strictly a parallelism pattern. There are no cross fringes. That is the fringes or darkened areas are parallel to the line grating and embossing. This plate is eventually used for a comparison standard, although it also serves as a check on the parallelism between the embossing plate 16 and the B sheet 100.

As a separate operation an image of a "B sheet" 100 (either the same or a different B sheet) is projected by a lens 110 on a sensitive film 111. Using the usual photographic processing represented by a block 112, this is processed to a transparent negative 113 of the "B sheet" 100. It is then overlayed with a sheet 115 of Mylar plastic.

Also by direct photography, a large number of positive images of a standard line grating such as 63 of FIG. 4, are made up. Four transparent grating images are required in the procedure illustrated in FIG. 11. These are made up to have exactly the same number of lines per inch as the lineiform images which are to be eventually printed. These line grating transparencies are produced on stripping film such as is commonly used in the graphic arts trade. The purpose of the next step of the procedure of FIG. 11 is to produce four such transparent line gratings juxtaposed on a Mylar sheet with the line gratings in strict parallelism relative to one another but not necessarily relative to the edges of the sheet. The conventional stripping operation is used in which a temporary thin transparent sheet 117 is laid on the Mylar sheet 115. One of the standard line gratings on stripping film 120 is laid on top of the sheet 117 but extending slightly over the edge. Viewing through the sandwich, one sees a moire pattern between the line grating 120 and the positive transparency 113 carrying the image of the "B sheet" 100. The grating transparency 120 is then adjusted until no cross fringes appear. Since the line grating 120 has the number of lines per inch of the eventual lineiform image and since the transparency 113 has a slightly different number of lines per inch corresponding to the "B sheet" 100, the parallel fringes appear, and it is at this stage that the pattern is compared with the previously made standard 102. This gives a double check on both the sizing and the parallelism of the line grating image 120.

When register has been achieved, the edge of the transparency 120 is firmly affixed against the Mylar sheet 115 and the temporary transparent sheet 117 is removed. As shown at 121 stripping film is then pressed firmly onto the Mylar sheet 115. The base 122 of each strip of film is then stripped off leaving the line grating pattern 123 stripped onto the Mylar sheet 115. Four such gratings all in perfect parallelism are now on the sheet 115 and the control 113 is removed. The next step involves overlaying the juxtaposed patterns 123 with a transparent sheet 125 which may also be of Mylar but glass has been used quite successfully.

Another stripping operation is performed, but in this case the images to be stripped onto the glass are the lineiform images from which a printing plate is to be made. For example these can be simple lineiform images for black-and-white processes or they are commonly color separation images of 3- or 4-color process. Using a temporary transparent sheet 127 during register of the strippable lineiform image 130, each lineiform image is oriented so as to produce no moire pattern with the underlying line grating 123. It should be noted that the line grating 123 and the lineiform image have exactly the same number of lines per inch and hence there is neither cross fringes nor parallel fringes of the moire type. A lineiform image 131 is pressed onto the glass 125. Stripping of the strippable base 132 from lineiform image 133 leaves the latter on the glass. The glass plate 125 with four lineiform images in perfect parallelism since each of them has been registered to be parallel to line gratings 123 which, in turn, are in perfect parallelism, is then set up in a process camera and photographed to make a printing plate 135 as illustrated in FIG. 12.

So far we have used the present invention, or at least the principle thereof, three times since the "B sheets" 100, which incorporate the principle of the invention as well as the sizing principle were prepared. The registering of the line gratings 123 incorporates the alignment feature at least relative to each other and also checks the sizing and finally the aligning of the images 133 on the glass plate 125, employing the moire feature to insure parallelism of the four lineiform images relative to one another. At this stage one then performs Procedure 3 above by mounting the printing plate at position 30 in FIG. 2 and printing onto several B sheets. Again the adjusting screw 46 is adjusted until the prints from the lineiform printing plate 135 show no moire pattern other than the parallel sizing pattern, relative to the B sheets. Then plain sheets of paper are run through the printing press producing four (and in actual practice 16) parallel lineiform images precisely oriented relative to the embossing plate 16 which is to emboss the picture after the plastic coating is placed thereon.

The invention and the various embodiments thereof have been described in detail, but it will be understood that the invention is not limited thereto. Rather it is to be interpreted in view of the scope of the appended claims.

I claim:

1. In the production of sterio pictures having a lenticular surface registered with a lineiform image, the method of insuring parallelism of a lenticular embossing means to a printed lineiform image coated with a transparent layer to be embossed, comprising the steps of:
    (a) printing on a plurality of sheets a correct line grating with the same number of lines per inch as, and in parallel register to, the embossing means,
    (b) overprinting from a printer plate the lineiform image on said sheets to produce moire patterns indicative of the lack of parallelism of the lineiform image and the correct line grating,
    (c) adjusting the lay of said printing plate until there is no noticeable moire pattern,
    (d) from the thus adjusted printing plate, printing said lineiform image on a plurality of plain sheets,
    (e) coating said sheets with said transparent layer, and
    (f) embossing said layer with said embossing means.

2. The method according to claim 1 including: printing a line grating on a plurality of sheets directly from the embossing means.

3. The method according to claim 1 in which step (a) includes:
    (i) printing on a plurality of sheets at least five line gratings at slight angles to each other, and each containing said number of lines per inch, the relative angle of adjacent line gratings being approximately the width of one line of the line grating, and
    (ii) coating said sheets with said transparent layer and embossing said layer with said embossing means to produce a moire pattern with each of the line grating prints except one, said one thereafter being the correct line grating.

4. In the production of stereo pictures having a lenticular surface registered with a lineiform image, the method of insuring parallelism of a lenticular embossing means to a printed lineiform image coated with a transparent layer to be embossed, comprising the steps of:
    (a) (i) printing with a first printing plate on a first plurality of sheets at least five line gratings each having the same number of lines per inch as the embossing means and each being at a slight angle with respect to the other, the relative angle of adjacent line gratings being on the order of the width of one line of the grating,
    (ii) coating some of said first plurality of sheets with said transparent layer and embossing said layer with said embossing means to produce a moire pattern with each of the line grating prints except one, said one thereafter being the correct line grating,
    (iii) overprinting from a second printing plate onto some of the others of said first plurality of sheets, another line grating with approximately the same number of lines per inch,
    (iv) adjusting the lay of said second printing plate until there is no noticeable moire pattern with said correct line grating,
    (v) from the thus adjusted second printing plate printing said another line grating on a second plurality of plain sheets, which sheets then have the said another line grating in parallel register with the embossing means,
    (b) overprinting from a third printing plate the lineiform image on said second sheets to produce moire patterns indicative of the lack of parallelism of the lineiform image and the said another line grating,
    (c) adjusting the lay of said third printing plate until there is no noticeable moire pattern,
    (d) from the thus adjusted third printing plate, printing said lineiform image on a third plurality of plain sheets,
    (e) coating said third plurality of sheets with said transparent layer, and
    (f) embossing said layer with said embossing means.

5. The method according to claim 4 including providing said second printing plate with one line more or less per inch than that of the first printing plate whereby a residual parallel type moire pattern results even when parallelism between the two is achieved and etc.

6. In the production of stereo pictures having a lenticular surface registered with a lineiform image, the method of insuring parallelism of a lenticular embossing means to a printed lineiform image coated with a transparent layer to be embossed, comprising the steps of:
    (a) (i) printing with a first printing plate on a first plurality of sheets at least five line gratings each having the same number of lines per inch as the embossing means and each being at a slight angle with respect to the other, the relative angle of adjacent line gratings being on the order of the width of one line of the line grating, (ii) coating some of said first plurality of sheets with said transparent layer and embossing said layer with said embossing means to produce a moire pattern with each of the line grating prints except one, said one thereafter being the correct line grating, (iii) overprinting from a second printing plate onto some of the others of said first plurality of sheets, another line grating with approximately the same number of lines per inch, (iv) adjusting the lay of said second printing plate until there is no noticeable moire pattern with said correct line grating, (v) from the thus adjusted second printing plate printing said another line grating on a second plurality of plain sheets, which sheets then have the said another line grating in parallel register with the embossing means, (b) (i) coating at least one of said second plurality of sheets with said transparent layer and embossing said layer with the embossing means to thereby form a comparison standard, (ii) preparing a plurality of first line grating transparencies with approximately the same number of lines as the embossing means, (iii) preparing a second transparency of at least one of said second plurality of sheets, having the said another line grating in parallel register with the embossing means, (iv) covering said second transparency with a first then transparent member, (v) placing and adjusting the said first transparencies upon said sheet so that the line gratings thereon are parallel with the grating of the second transparency and the pattern formed thereby resembles the pattern formed on the said coated and embossed second plurality of sheets, (c) (i) covering the said first member by a second transparent member, (ii) placing and adjusting a plurality of lineiform picture images upon said second transparent member in a parallel relationship with the line gratings on said first member, (iii) preparing a single third printing plate from the collage of lineiform images, (d) overprinting from said third printing plate the lineiform images on said second sheets to produce moire patterns indicative of the lack of parallelism of the said images and the said another line grating, (e) adjusting the lay of said third printing plate until there is no noticeable moire pattern, (f) from the thus adjusted third printing plate, printing said lineiform images on a third plurality of plain sheets, (g) coating said third plurality of sheets with said transparent layer, and (h) embossing said layer with said embossing means thereby forming a collage of pictures with assurance of parallelism and size.

7. The method according to claim 6 in which said second printing plate has one line more or less per inch than that of the first printing plate thereby providing a residual parallel type moire pattern even when parallelism is achieved and adjusting the temperature of the embossing means to assure its proper size, so that the said means will also give a similar residual parallel type moire with respect to the line grating on said second plurality of sheets and eliminate said parallel moire with respect to the lineiform image.

References Cited

UNITED STATES PATENTS 3,241,429   3/1966   Rice et al. _____________ 350—167

JEWELL H. PEDERSEN, Primary Examiner

T. MOHR, Assistant Examiner

U.S. Cl. X.R.

95—12.21; 101—211, 426; 350—167, 320

PO-1050
(5/69)

UNITED STATES PATENT OFFICE
CERTIFICATE OF CORRECTION

Patent No. 3,462,226          Dated August 19, 1969

Inventor(s) James E. Huffaker     (Sheet 1 of 2 Sheets)

It is certified that error appears in the above-identified patent and that said Letters Patent are hereby corrected as shown below:

Column 1, line 30 of the patent, (corresponding to page 1, line 12 of the application), delete "phonograph" and insert in place thereof---photograph---.

Column 1, line 36 of the patent, (corresponding to page 1, line 17 of the application), delete "obtainend" and insert in place thereof---obtained---.

Column 1, line 66 of the patent, (corresponding to page 2, line 12 of the application), delete "wih" and insert in place thereof---with---.

Column 3, line 36 of the patent, (corresponding to page 5, line 23 of the application), after the word "alignment" insert---of---

Column 8, line 43 of the patent, (corresponding to page 16, line 28 of the application), after the word "with" insert ---line---.

Column 10, line 31 of the patent, (corresponding to page 20, line 28 of the application), delete "shee" and insert in place thereof---sheet---.

Column 12, line 69 of the patent, (corresponding to Claim 5 of the application), delete "etc." and insert in place thereof ---adjusting the temperature of the embossing means to assure its proper size, so that the said means will also give a similar residual parallel type moire with respect to the line grating on said second plurality of sheets to thereby eliminate said parallel moire with respect to the lineiform image.---

Column 13, line 37 of the patent, (corresponding to Claim 6, line 39 of the application), delete "then" and insert in place thereof---thin---.

PO-1050
(5/69)

UNITED STATES PATENT OFFICE
CERTIFICATE OF CORRECTION

Patent No. 3,462,226      Dated August 19, 1969

Inventor(s) James E. Huffaker      (Sheet 2 of 2 Sheets)

It is certified that error appears in the above-identified patent and that said Letters Patent are hereby corrected as shown below:

Column 13, line 40 of the patent (corresponding to Claim 6, line 42 of the application), after the word "the" insert ---line---.

SIGNED AND
SEALED
JUN 2 1970

(SEAL)
Attest:

Edward M. Fletcher, Jr.
Attesting Officer

WILLIAM E. SCHUYLER, JR.
Commissioner of Patents